(12) United States Patent
Kishimoto et al.

(10) Patent No.: US 8,736,793 B2
(45) Date of Patent: May 27, 2014

(54) LIQUID CRYSTAL DISPLAY PANEL, AND LIQUID CRYSTAL DISPLAY DEVICE

(75) Inventors: Satoru Kishimoto, Osaka (JP); Toshio Fujii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 160 days.

(21) Appl. No.: 13/580,813

(22) PCT Filed: Nov. 5, 2010

(86) PCT No.: PCT/JP2010/069746
§ 371 (c)(1),
(2), (4) Date: Aug. 29, 2012

(87) PCT Pub. No.: WO2011/104943
PCT Pub. Date: Sep. 1, 2011

(65) Prior Publication Data
US 2012/0314165 A1    Dec. 13, 2012

(30) Foreign Application Priority Data

Feb. 24, 2010 (JP) ................................. 2010-039305

(51) Int. Cl.
*G02F 1/1335* (2006.01)
*G02F 1/1333* (2006.01)
*G02F 1/136* (2006.01)

(52) U.S. Cl.
USPC .............................. 349/113; 349/110; 349/44

(58) Field of Classification Search
CPC ................... G02F 1/133512; G02F 1/133553; G02F 1/136227; G02F 2001/133388
USPC ........................................... 349/113, 110, 44
See application file for complete search history.

(56) References Cited

U.S. PATENT DOCUMENTS

| | | | |
|---|---|---|---|
| 6,038,006 A | 3/2000 | Sasaki et al. | |
| 7,573,553 B2 * | 8/2009 | Itou et al. | 349/117 |
| 8,476,654 B2 * | 7/2013 | Tanaka et al. | 257/89 |
| 2002/0057407 A1 | 5/2002 | Yamaguchi et al. | |
| 2008/0017862 A1 | 1/2008 | Lee et al. | |

FOREIGN PATENT DOCUMENTS

| | | |
|---|---|---|
| JP | 10-73809 A | 3/1998 |
| JP | 2000-267141 A | 9/2000 |
| JP | 2002-148609 A | 5/2002 |
| JP | 2002-182191 A | 6/2002 |
| JP | 2003-287746 A | 10/2003 |
| JP | 2008-28395 A | 2/2008 |
| JP | 2008-66678 A | 3/2008 |
| JP | 2008-66680 A | 3/2008 |

* cited by examiner

*Primary Examiner* — Mike Qi
(74) *Attorney, Agent, or Firm* — Chen Yoshimura LLP

(57) ABSTRACT

The present invention provides a liquid crystal display panel and a liquid crystal display device presenting a reduced color addition and an improved bright room contrast. The liquid crystal display panel of the present invention includes wirings made of a metal having at least 90% reflection over a wavelength region within the visible light region, where the reflectance of the liquid crystal panel over a wavelength range of 600 to 700 nm at the display surface is no greater than 150% of the reflectance at the wavelength of 550 nm at the display surface.

6 Claims, 11 Drawing Sheets

LIQUID CRYSTAL DISPLAY PANEL, AND LIQUID CRYSTAL DISPLAY DEVICE

TECHNICAL FIELD

The present invention relates to a liquid crystal display panel and a liquid crystal display device. More particularly, the present invention relates to a liquid crystal panel and a liquid crystal display device suitable for multi-coloring and higher resolution.

BACKGROUND ART

Liquid crystal display devices have been attracting attentions as display devices that can provide features such as light weight, thin profile, and low power consumption. They are essential in everyday living and in businesses today for use in mobile devices, various monitors, large TVs, and the like. In particular, active matrix liquid crystal display devices using thin film transistors (TFT) as the pixel switching elements (driver elements) have significantly expanded their market share due to their favorable features such as a high contrast ratio and a fast response time. For such liquid crystal display devices, continuous research and development are being conducted for a better performance in image and display quality such as advanced multi-coloring and a higher resolution and for more versatile functions in response to expanded needs and further technological advancement.

A conventional liquid crystal display device disclosed (see Patent Document 1, for example) has a liquid crystal display panel configured to have two transparent substrates with liquid crystals sealed in between them. Of the two surfaces of the transparent substrates that are facing each other, one of the surfaces has an opposite electrode, color filters, an alignment film, and the like formed thereon, and the other surface has TFTs, pixel electrodes (display electrodes and common electrodes), an alignment film, and the like formed thereon. Such a liquid crystal display panel further includes a plurality of gate bus lines and a plurality of data bus lines crossing the gate bus lines formed thereon. An embodiment of this liquid crystal display panel includes black matrices, which are formed in parallel to the data bus lines, where the width of the data bus lines is set to 4 μm while the width of the black matrices is set to 8 μm. Substrates using copper or a copper alloy as the conductive film or the conductive lines are also disclosed (see Patent Documents 2 to 4, for example).

RELATED ART DOCUMENTS

Patent Documents

Patent Document 1: Japanese Patent Application Laid-Open Publication No. 2000-267141 (pages 1, 2, and 11, and FIG. 7 on page 18)
Patent Document 2: Japanese Patent Application Laid-Open Publication No. 2008-66680 (pages 2 and 6)
Patent Document 3: Japanese Patent Application Laid-Open Publication No. 2008-66678 (pages 2 and 6)
Patent Document 4: Japanese Patent Application Laid-Open Publication No. 2008-28395 (pages 2 and 7)

SUMMARY OF THE INVENTION

Problems to be Solved by Invention

From the perspective of the aperture ratio increase and the transmittance improvement, as shown in FIG. 16, for example, liquid crystal display panels (LCD panels) manufactured so far have black matrices disposed over TFT elements, over spacers, between picture elements, and the like when the panel main surface is observed in a plan view. Regions shielded from the light are thus limited. Specifically, in those configurations, a black matrix 321T as the TFT light-shielding section and a black matrix 321S as the spacer light-shielding section are disposed in each of the picture element where a red color filter 322R is disposed, the picture element where a green color filter 322G is disposed, and the picture element where a blue color filter 322B is disposed. Also, a black matrix 321P is disposed as the inter-picture element light-shielding section.

On the other hand, no black matrix is disposed over other wirings, i.e., an auxiliary capacitance wiring 311a and a gate wiring 311b. Consequently, the exposure ratio of the metal wiring on the TFT substrate in each picture element was large.

Wirings disposed on the substrate of the LCD panel are metal wirings. However, for a better performance of the panels, a demand for low-resistance wirings featuring lower resistance than conventional wirings is on the rise.

However, some metal wirings that can provide an increased performance has a high reflectance. Consequently, when external light enters the panel, excessive amount of unnecessary reflection occurs within the panel due to the metal wiring reflection, which can lead to the display quality deterioration. That is, in the case of the conventional LCD panels, in particular where multiple types of metal wirings are used such as on the TFT substrate, for example, the light reflection of the metal wirings on the substrate caused problems such as color addition by the external light reflection and a reduced bright room contrast.

The present invention was devised in consideration of problems described above, and is aiming at providing a liquid crystal display panel that includes metal wirings and that, particularly in a configuration constituted of different types of metal wirings such as a TFT substrate, presents less color addition and an improved bright room contrast, and a liquid crystal display device including such a liquid crystal panel.

Means for Solving the Problems

In the course of studying liquid crystal display panels and liquid crystal display devices that include metal wirings, inventors of the present invention found that some metal wirings have a high spectral reflectance over a particular wavelength range within the visible light wavelength range, and as a result, upon entry of external light, generates excessive reflected light over the substrate within the liquid crystal display panel, leading to a color addition and the reduced bright room contrast due to the external light reflection. This becomes noticeable especially in a configuration composed of multiple types of metal wirings such as a TFT substrate, or when the metal wirings used are low-resistance wirings. In this context, regarding the liquid crystal display panel having metal wirings of certain reflectance, inventors of the present invention focused on the reflectance over a specific wavelength range of 600 to 700 nm in relation to the reflectance at a wavelength of 550 nm. Then, the inventors of the present invention found that a reddish brown color addition occurs and the bright room contrast is reduced when the reflectance over the specific wavelength range is high, but when the reflectance of the specific wavelength range is no greater than 150%, the reddish brown color addition is reduced and the bright room contrast is improved. As a result, the above-mentioned problems have been admirably solved, leading to completion of the present invention.

The technological significance of the present invention is the optimization of numerical range of the reflectance over a specific wavelength range of the liquid crystal display panel. In other words, the significance lies in the identifying of the connection between a specific configuration limiting the reflectance and specific objective and effect. This connection had never been recognized in the conventional technology.

That is, the present invention is a liquid crystal display panel including wirings constituted of metals having a reflectance of at least 90% over a wavelength range within the visible light range, where the reflectance at the display surface over the wavelength of 600 to 700 nm is no greater than 150% of the reflectance at the display surface at the wavelength of 550 nm.

For example, based on the spectral reflectance of the metals in individual picture elements, which metals are not shielded from the light by a light-shielding layer such as a black matrix (hereinafter also simply referred to as black matrix), preferably additional black matrices are provided to limit the reflectance over the range of 600 to 700 nm to 150% of the reflectance at 550 nm, which is the central wavelength of the white balance where all colors in are synthesized. By limiting the above-mentioned reflectance to no more than 150%, the reddish brown color addition in the liquid crystal display panel can sufficiently be reduced, and the bright room contrast can be improved. Also, it is difficult to minimize the lower limit of the above-mentioned reflectance to substantially 0%, because of the characteristics of the metals having a 90% or higher reflectance over a wavelength range within the visible light range. From such a perspective, the lower limit of the above-mentioned reflectance is preferably 50% or higher, for example. More preferably, the lower limit is 100% or higher.

The reflectance is measured by projecting the light on a sample uniformly from all directions using an integrating sphere (a sphere whose inner surface is coated with a white paint that diffusely reflect light almost perfectly, such as barium sulfate) or the like, and receiving reflected light from a single direction.

The above-mentioned reflectance refers to the reflectance of the light reflected towards the display side of the display panel (viewer's side). There is no particular upper limit of the above-mentioned reflectance as long as the lowest reflectance over the range of 600 to 700 nm at the display panel is 150% or lower. However, more preferably, the average reflectance is no greater than 150%. Most preferably, the maximum reflectance over the range of 600 to 700 nm at the display panel is no greater than 150%.

On the other hand, there is no particular lower limit of the above-mentioned reflectance as long as the maximum reflectance over the range of 600 to 700 nm satisfy the above-mentioned lower limit, i.e., the maximum reflectance is the above-mentioned lower limit or higher, but more preferably, the average reflectance satisfies the above-mentioned lower limit. Most preferably, the minimum reflectance over the range of 600 to 700 nm at the display panel satisfies the above-mentioned lower limit.

Metals that may be used in a liquid crystal display panel of the present invention are silver, gold, copper, or alloys of those metals, for example. In particular, those having a reflectance of at least 90% over the wavelength range of 600 to 700 nm are preferable. More preferably, those are the metals having a reflectance of at least 95%. Among those metals, preferably the above-mentioned metals are copper or a copper alloy. In a liquid crystal display device in which metal wirings having a color peculiar to that metal, such as copper or copper alloy, color addition by the metal wirings can be more appropriately be reduced by providing black matrices at places, in addition to the black matrices already formed on the color filter substrate. That is, the configuration in which a reflectance is at least 90% is appropriately used when the surface layer section of the metal wirings is constituted of any of the above-mentioned metals. Such metals are normally considered as causing reflection of incoming light, but by employing a configuration of the present invention, undesirable outcome due to the reflected light can sufficiently be suppressed.

As long as the liquid crystal display panel and liquid crystal display device of the present invention include these constituting elements as their essential elements, the configurations of them are not particularly limited by other constituting elements.

Preferred configurations of the liquid crystal display panel and the liquid crystal display device of the present invention are described in detail below.

One of the preferred configurations of the liquid crystal display panel of the present invention is the one in which, when the main surface of the panel is observed in a plan view, at least 75% of the surface area of the metal in each picture element that displays the color of red overlaps a light-shielding layer. According to such a configuration, the reddish brown color addition can appropriately be reduced. The upper limit in the overlapping ratio of the metal and the light-shielding layer is 100%, for example. The reflectance is measured in the manner as described above.

The preferred configuration described above is effective especially when a low-resistance wiring with a reddish color such as copper or copper alloy is used. Also, in order to maximize the aperture ratio in non-red picture elements, and to sufficiently solve the problem of reddish-brown color addition in red picture elements, preferably the ratio of the metal wiring overlapping the light-shielding layer is increased and additional black matrices are provided only in picture elements displaying a color of red.

In the above-mentioned preferred configuration, if the substrate is an active matrix system substrate using TFTs, preferably in the picture elements displaying a color of red, the ratio of the metal overlapping the light-shielding layer is increased by at least 30% more than a conventional exposed metal area, and a black matrix is additionally disposed. That is, preferably in picture elements displaying a color of red, the ratio of the metal overlapping the light-shielding layer is increased by at least 30% as opposed to the area of the region where the black matrix is disposed only over the TFT elements, over the spacers, and between the picture elements and the remaining portion of the metal is exposed. More preferably, only in picture elements displaying a color of red, the ratio of the metal overlapping the light-shielding layer is increased by at least 30%. In these cases, the black matrix area is increased by at least 30%.

The exposed metal area refers to the area of the region where incoming external light is reflected by the metal in the liquid crystal display panel. Normally, metal wirings are covered by various kinds of films or the like. However, light is reflected by the wirings in regions not overlapping any light-shielding layer such as the black matrix when observed in a plan view. In this specification, when an item is stated as "exposed," it means that, when observed in a plan view, the item is not configured to be covered by a light-shielding layer such as the black matrix.

In the configurations described above, for example, preferably, in picture elements displaying a color of red, black matrices are disposed over TFT elements, over the spacers, and between picture elements, and also over a part of the gate bus lines and/or the auxiliary capacitance wirings. In this case, the black matrix is disposed over at least 30% of or preferably over the above-mentioned range of percent of the exposed metal area of the gate bus lines and the auxiliary capacitance wirings (area of the metal reflection region). The above-mentioned exposed metal area of the gate bus lines and the auxiliary capacitance wirings excludes the metal area already shielded from the light by the black matrices disposed over TFT elements, over the spacers, and between picture elements.

In the preferred configurations described above, the ratio of the metal overlapping the light-shielding layer in picture elements displaying a color of red and the exposed metal area are explained. Preferably, the configurations apply to picture elements displaying a color of yellow and/or a color of cyan as well as picture elements displaying a color of red, which are found in multi-primary color liquid crystal display panels using RGBY four primary colors that includes yellow (Y) in addition to RGB three primary colors of red (R), green (G), and blue (B); RGBC four primary colors that includes picture elements of a color of cyan (C) in addition to RGB; and other multi-primary colors requiring RGBY or RGBC with additional colors. Preferably, in these configurations, additional black matrices are provided in red, yellow, and/or cyan picture elements, and no additional black matrix is provided in other picture elements, as in the above-mentioned configurations. This is because the reddish brown color addition associated with the exposed metal occurs in yellow and cyan picture elements as in red picture elements.

More preferably, in a liquid crystal display panel requiring RGBY, the configurations apply to yellow picture elements as well as picture elements displaying a color of red.

For example, preferably, as opposed to the area of the region where the black matrices are disposed only over TFT elements, over the spacers, and between picture elements and the remaining metal portion is exposed, in each of red, yellow, and/or cyan picture elements, the ratio of the metal overlapping the light-shielding layer is increased by at least 30%. More preferably, only in each of red, yellow and/or cyan picture elements, the ratio of the metal overlapping the light-shielding layer is increased by at least 30% as described above. The upper limit of the ratio of the metal overlapping the light-shielding layer is 100%, for example.

Further, in configurations using four or more primary colors, if red, yellow, and/or cyan picture elements are required, preferably more additional black matrices are disposed in red picture elements than in yellow and/or cyan picture elements. For example, preferably the black matrix area in red picture elements are increased by at least 50%, and the black matrix area in yellow and/or cyan picture elements are increased by at least 30% and less than 50%. The influence of the light reflection caused by the metal wirings on the contrast is more significant in red picture elements than in yellow or cyan picture elements. That is, especially when the surface layer section of the metal wiring used is made of copper or an alloy containing copper, the influence to the contrast, which is a reddish brown color addition, is normally the most significant in red picture elements.

Preferred configurations of the above-mentioned multiple primary colors, which are the four primary colors or more colors, are configurations of display devices having a display surface composed of pixels including red, green, blue, and yellow sub-pixels, where red and/or blue sub-pixels have a greater aperture area than other sub-pixels (a configuration in which the aperture area of red sub-pixels is the greatest, a configuration in which the aperture area of blue sub-pixels is the greatest, and a configuration in which the aperture areas of red sub-pixels and blue sub-pixels are both the greatest of all the sub-pixels), and where the aperture area of green and/or yellow sub-pixels is smaller than the aperture area of other sub-pixels (a configuration in which the aperture area of green sub-pixels is the smallest, a configuration in which the aperture area of yellow sub-pixels is the smallest, and a configuration in which the aperture area of green and yellow sub-pixels are both the smallest of all the sub-pixels). Yellow may be replaced by cyan. Alternatively, both yellow and cyan may be included. Further, in another possible configuration, the above-mentioned pixel includes a red sub-pixel and/or a blue sub-pixel whose color characteristics are different from one another.

In the liquid crystal display device of four or more primary colors, as more primary colors are used for the display, visibility can be deteriorated mainly due to the reduced brightness of red. Also, if a light source of a high color temperature is used to adjust the tone of the white display, the brightness of the red display further declines, and visibility is further deteriorated accordingly. According to the above-mentioned preferred configuration, bright red can be displayed, and therefore visibility improves. With this advantage, together with other benefits of the configurations of the present invention, the color addition due to the external light reflection can be reduced, and the reduction in the bright room contrast can be controlled.

A preferred configuration of the liquid crystal display panel of the present invention is that when the main surface of the panel is observed in a plan view, at least a portion of the above-mentioned wiring overlaps the light-shielding layer having a width which is about equal to or smaller than the width of the wiring. More preferably, the wiring overlaps with the light-shielding layer that has a width smaller than the width of the wiring. Normally, to cover the metal wiring with the black matrix, the width of the black matrix to be disposed is set to a little wider than the width of the metal wiring in consideration of possible manufacturing errors and the like. However, in the present invention, even with a narrower black matrix, reduction in contrast due to the light reflection by the metal wiring can be prevented and the transmittance can be increased sufficiently because of the improved aperture ratio.

According to such configurations, color tones can be controlled while the light-shielding ratio is appropriately adjusted.

Also, in the above-mentioned preferred configuration where additional black matrices are provided, preferably at least a portion of the metal wiring overlaps the light-shielding layer having a width about equal to or smaller than the width of the wiring. Therefore, in picture elements displaying a color of red, if there are picture elements displaying yellow and/or cyan in addition to red, in picture elements displaying red, yellow, and/or cyan, preferably, the black matrices are disposed over TFT elements, over the spacers, and between picture elements, and also over a portion of the gate bus line and/or auxiliary capacitance wiring so that at least a portion of the gate bus line and/or the auxiliary capacitance wiring overlaps the black matrix having a width about equal to or smaller than the width of the wiring. In this case also, more preferably, in the liquid crystal display panel requiring the RGBY, this configuration applies not only to red picture elements, but also to yellow picture elements. Also, more preferably, the wiring overlaps the light-shielding layer having a width smaller than the width of the wiring. Further, according to the above-mentioned configurations, the benefit which can be obtained from using the wiring having a surface layer section constituted of copper or an alloy containing copper is two-fold: such wiring can appropriately reduce the reddish brown color addition and provides a beneficial feature of low resistance.

Further, preferably, the above-mentioned configurations and preferred configurations of the present invention are applied to a liquid crystal display panel including an active matrix substrate using thin film transistors (TFTs). In this case, gate bus lines are preferably disposed on a transparent substrate constituting the liquid crystal display panel. More preferably, the gate bus lines and auxiliary capacitance wirings are disposed.

The present invention also provides a liquid crystal display device including a liquid crystal display panel of the present invention. The liquid crystal display device of the present invention presents reduced color addition and excellent bright room contrast.

Configurations described above can be combined as appropriate within the spirit of the present invention.

Effects of the Invention

A liquid crystal display panel and a liquid crystal display device of the present invention can provide reduced color addition and improved bright room contrast.

DETAILED DESCRIPTION OF EMBODIMENTS

In this specification, the circuit substrate is also referred to as TFT side substrate, because this is the substrate on which TFTs are provided in embodiments. The substrate that faces the circuit substrate is also referred to as CF side substrate, because this is the substrate on which color filters (CF) are disposed in embodiments. The surface layer section refers to the layer on the side of display surface of the display panel.

The present invention is further described in detail below using embodiments and with reference to figures. However, the present invention is not limited only to these embodiments. The reflectance is measured by projecting light on a sample uniformly from all directions using an integrating sphere (a sphere whose inner surface is coated with a white paint that diffusely reflect light almost perfectly, such as barium sulfate) or the like, and receiving reflected light from a single direction.

Embodiment 1

A liquid crystal display panel of Embodiment 1 was obtained through steps (1) to (4) below. However, steps for obtaining a liquid crystal display panel of this embodiment are not limited to those described below. (1) A TFT substrate employing a low-resistance copper wiring as the metal wiring was used. Copper alloy wiring may also be suitably used. The surface layers of the gate wiring, auxiliary capacitance wiring, and source wiring of the liquid crystal display panel of Embodiment 1 are all high reflectance wirings (copper wiring). However, metals of a high reflectance may also be used only some of the surface layer sections. For example, only the surface layer section of the gate wiring may be composed of a high reflectance wiring. The surface of the metal wirings may be flat or having recesses and protrusions as long as the specified reflectance is maintained. The wiring having a surface layer of a high reflectance wiring may be configured to have the high reflectance layer exposed at the top, such as the configuration in which a transparent electrode is disposed over the high reflectance wiring. (2) A color filter substrate constituted of three colors, R (red), G (green), and B (blue), was used. (3) On the color filter substrate, additional black matrices were disposed only for R picture elements over locations other than conventionally-covered TFT elements, the spacers, and the space between picture elements. Additional black matrices were provided only in R picture elements to increase the black matrix area by 30% more than the conventionally exposed metal area. (4) The substrate of (1) and the color filter substrate of (2) were bonded together with liquid crystals sealed in between them. This completed the liquid crystal display device.

Figure 1:
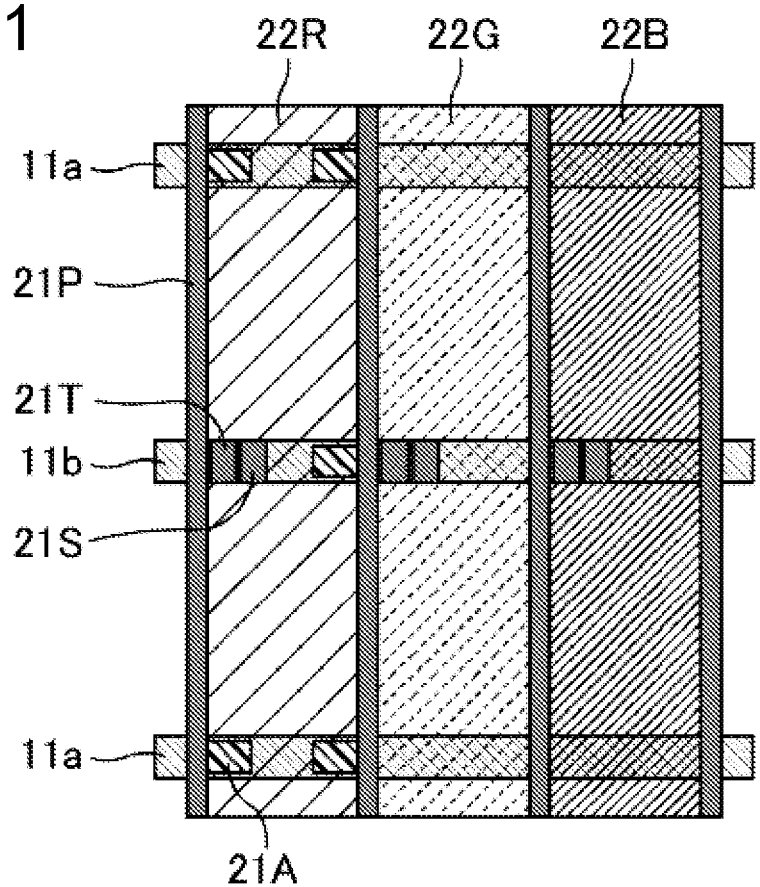
FIG. 1 is a plan view schematically showing a pixel of a liquid crystal display panel of Embodiment 1.

FIG. 1 is a plan view schematically showing a pixel of the liquid crystal display panel of Embodiment 1.

As shown in FIG. 1, the liquid crystal display panel of Embodiment 1 has black matrix disposed over TFT elements, over spacers, and between picture elements when the main surface of the panel is observed in a plan view. Specifically, a black matrix 21T as the TFT light-shielding section and a black matrix 21S as the spacer light-shielding section are provided in each of the picture element where a red color filter 22R is disposed, the picture element where green color filter 22G is disposed, and the picture element where a blue color filter 22B is disposed. Also, a black matrix 21P is disposed as the inter-picture element light-shielding section. Further, only in the picture element in which the red color filter 22R is disposed, an additional black matrix 21A is disposed over an auxiliary capacitance wiring 11a and a gate wiring 11b. In each red picture element of the liquid crystal panel of Embodiment 1, at least 75% of the surface area of the wirings overlaps a light-shielding layer when the main surface of the panel is observed in a plan view. The amount of the additional light-shielding layer disposed accounts for 30% of the conventionally exposed metal area in the red picture element. The black matrix 21A, which is additionally provided, has a width that is smaller than both the width of the auxiliary capacitance wiring 11a and the width of the gate wiring 11b.

As shown in FIG. 1, the color arrangement of the color filter in Embodiment 1 is a repeated pattern of RGB, and the area ratio of the colors are 1.0:1.0:1.0.

Figure 2:
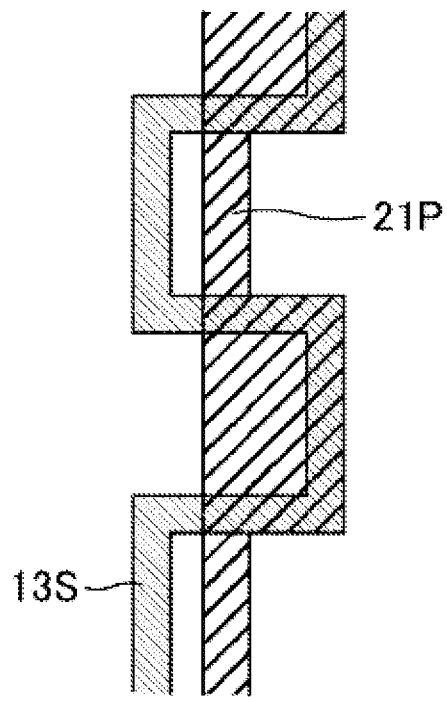
FIG. 2 is an enlarged view showing a part of the source wiring of the liquid crystal display panel of Embodiment 1.

FIG. 2 is an enlarged view showing a part of the source wiring of the liquid crystal display panel of Embodiment 1.

A source wiring 13S is disposed in a zigzag pattern. When the main surface of the panel is observed in a plan view, a portion of the source wiring 13S is located in the red picture element, and the remaining portion is in picture elements other than red (in the blue picture element, for example). Here, the black matrix is preferably disposed so that it overlaps at least the source wiring 13S located in the red picture element. From the perspective of transmittance, a more preferable configuration is that the black matrix is disposed so that it only overlaps the source wiring 13S located in the red picture element.

Figure 3:
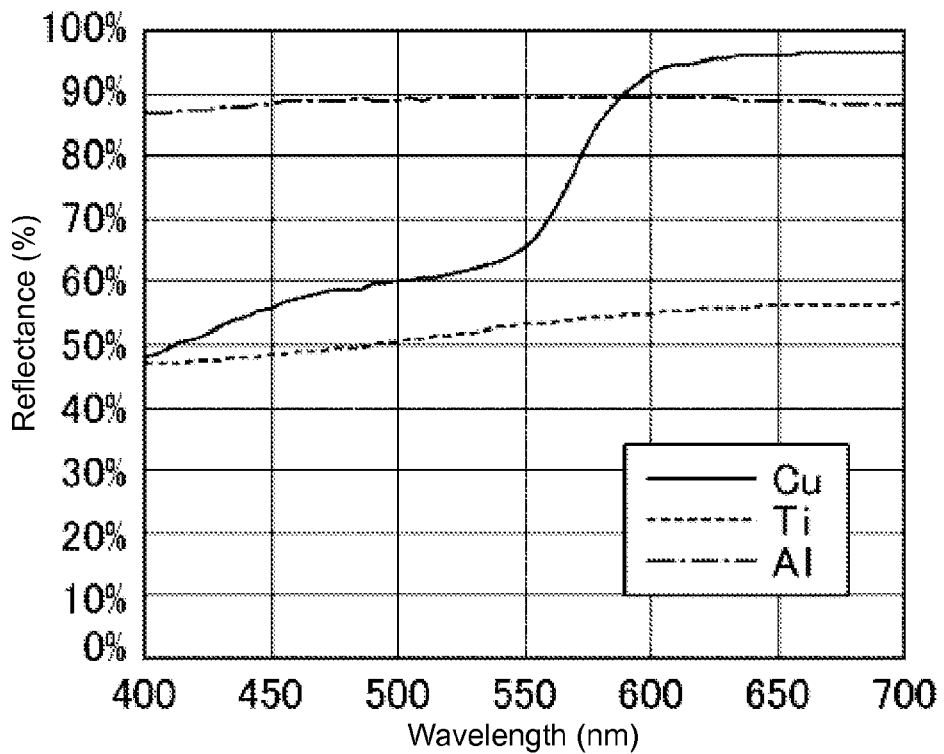
FIG. 3 is a graph showing the spectral reflectance of a copper wiring, aluminum wiring, and titanium wiring.

FIG. 3 is a graph showing the spectral reflectance of a copper wiring, an aluminum wiring, and a titanium wiring.

That is, FIG. 3 shows the spectral reflectance of copper wirings used for the liquid crystal display panel of this embodiment. As shown in FIG. 3, the reflectance of the copper wiring is 90% or higher over the wavelength range of 590 to 700 nm. On the other hand, the reflectance of the aluminum wiring and the titanium wiring over the visible light range is less than 90%. They are not as low resistant as the copper wiring, but they do not add much color.

Figure 4:
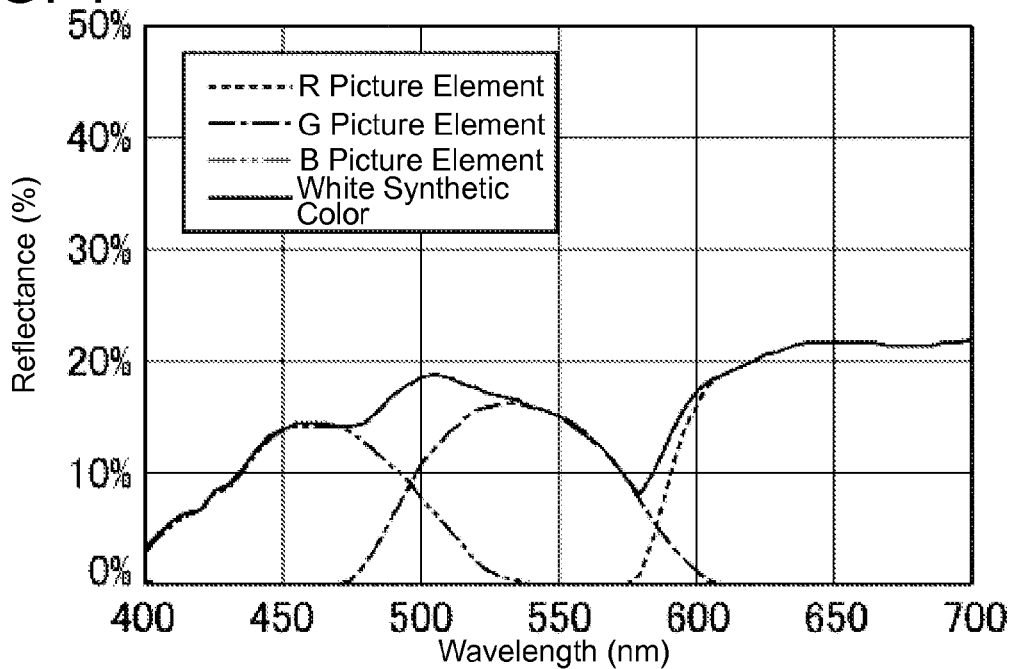
FIG. 4 is a graph showing the spectral reflectance of the liquid crystal display panel of Embodiment 1.

FIG. 4 is a graph showing the spectral reflectance of the liquid crystal display panel of Embodiment 1.

As shown in the graph, the reflectance over the wavelength range of 600 to 700 nm can be suppressed by providing additional black matrix only in the red picture element (R picture element).

Figure 5:
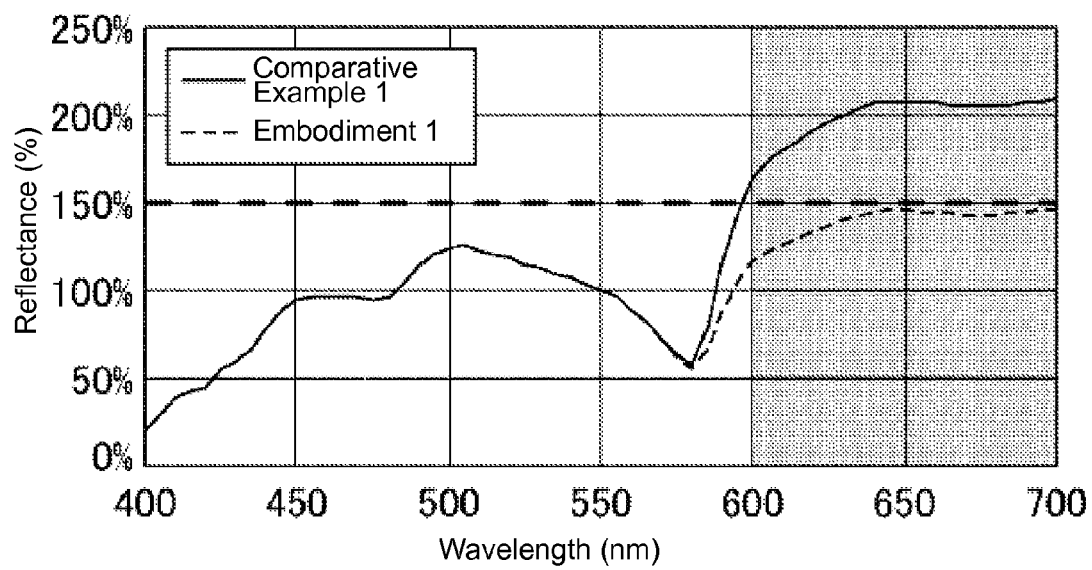
FIG. 5 is a graph showing the spectral reflectance of the liquid crystal display panel of Embodiment 1 and the spectral reflectance of a liquid crystal display panel of Comparative Example 1 relative to the reflectance at a wavelength of 550 nm, where the reflectance at a wavelength of 550 nm is defined to be 100%.

FIG. 5 is a graph showing the spectral reflectance of the liquid crystal display panel of Embodiment 1 and the spectral reflectance of a liquid crystal display panel of Comparative Example 1 relative to the reflectance at a wavelength of 550 nm, where the reflectance at a wavelength of 550 nm is defined to be 100%.

The liquid crystal panel of Embodiment 1 has a reflectance over the wavelength range of 600 to 700 nm at the display surface that is no greater than 150% of the reflectance at the wavelength of 550 nm at the display surface.

Figure 6:
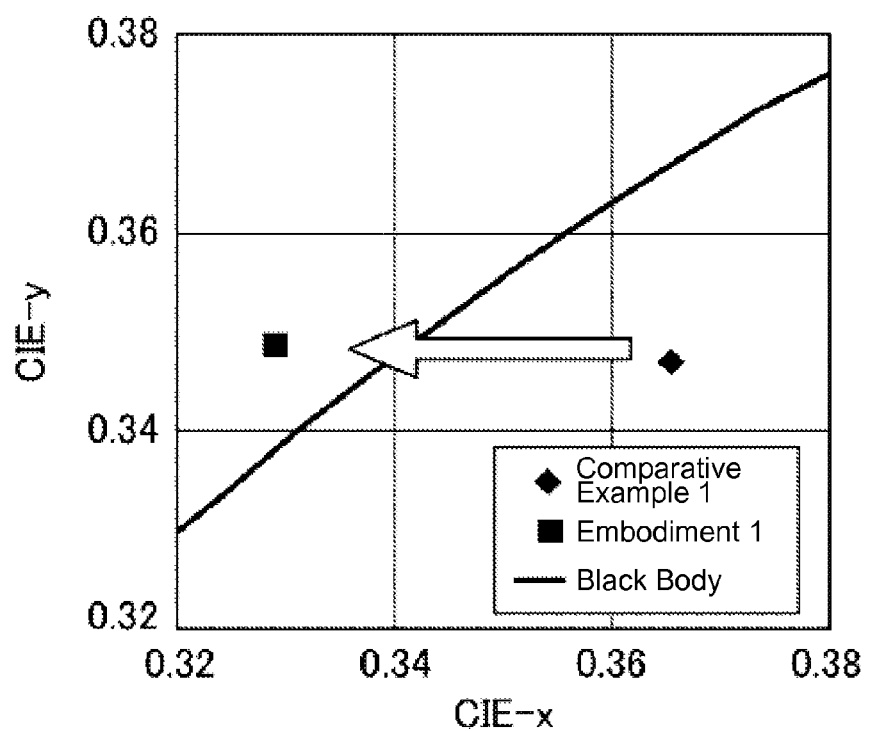
FIG. 6 is a graph showing the reflected light chromaticity of the liquid crystal display panel of Embodiment 1 and the reflected light chromaticity of the liquid crystal display panel of Comparative Example 1.

FIG. 6 is a graph showing the reflected light chromaticity of the liquid crystal display panel of Embodiment 1 and the reflected light chromaticity of the liquid crystal display panel of Comparative Example 1. FIG. 6 is presented in the XYZ color system. "Black body" in FIG. 6 refers to the black body locus on the xy chromaticity diagram. In the graph of FIG. 6, the color becomes more reddish towards right, becomes more bluish towards left, are becomes more greenish upwards. The same applies to FIG. 11.

In the liquid crystal display panel of Embodiment 1, black matrices are disposed over a portion of exposed sections of the metal wirings on the TFT substrate, and the additional black matrices are disposed so that the reflectance over the range of 600 to 700 nm is no greater than 150% of the reflectance at 550 nm, which is the central wavelength of the white balance where all colors are synthesized. As a result, the black body locus can be approximated on the chromaticity diagram, the reddish brown color addition that is peculiar to copper wirings can be reduced, and a liquid crystal display device with a good display quality can be manufactured.

Figure 7:
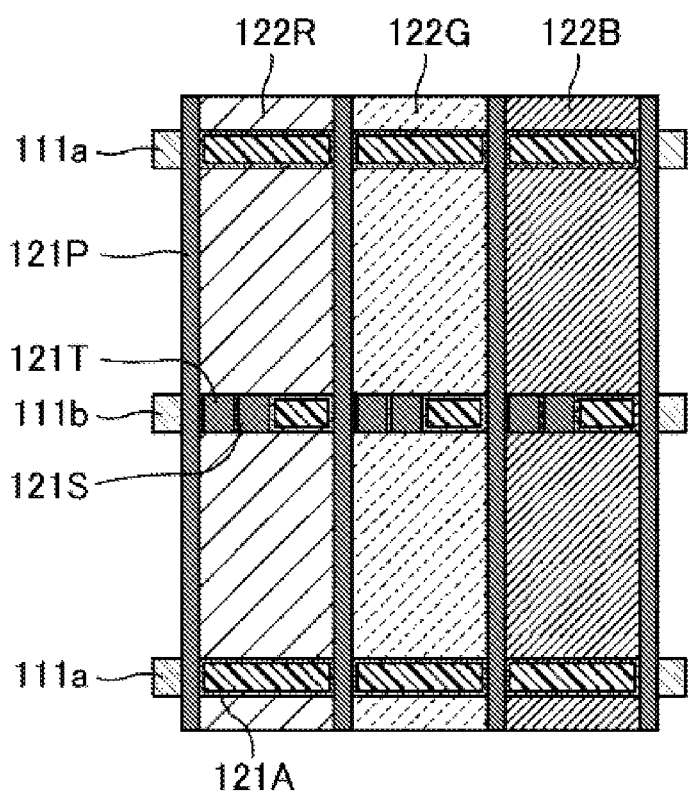
FIG. 7 is a plan view schematically showing a pixel of a liquid crystal display panel of a modification example of Embodiment 1.

FIG. 7 is a plan view schematically showing a pixel of a liquid crystal display of a modification example of Embodiment 1.

As shown in FIG. 7, in the liquid crystal panel of a modification example of Embodiment 1, the black matrices are disposed over the TFT elements, over the spacers, and between the picture elements when the panel main surface is observed in a plan view. Specifically, a black matrix 121T is provided as the TFT light-shielding section, and a black matrix 121S is provided as the spacer light-shielding section in each of the picture element where a red color filter 122R is disposed, the picture element where a green color filter 122G is disposed, and the picture element where a blue color filter 122B is disposed. Also, a black matrix 121P is provided as the inter-picture element light-shielding section. Further, an additional black matrix 121A is provided over the auxiliary capacitance wiring 111a and the gate wiring 111b. The additional black matrix 121A has a width that is smaller than both the width of the auxiliary capacitance wiring 111a and the width of the gate wiring 111b. The color addition can be reduced in such a liquid crystal display panel, and with such a panel, a liquid crystal display device with good display quality can be manufactured.

Embodiment 2

A liquid crystal display panel of Embodiment 2 was obtained through steps (1) to (4) below. However, steps for obtaining a liquid crystal display panel of this embodiment are not limited to those described. (1) A TFT substrate employing a low-resistance copper wiring as the metal wiring was used. Copper alloy wiring may also be suitably used. The gate wiring, auxiliary capacitance wiring, and source wiring of the liquid crystal display panel of Embodiment 2 are all made of high reflectance wirings (copper wiring). However, metals of a high reflectance may also be used only for some of the surface layer sections. For example, only the surface layer section of the gate wiring may be composed of a high reflectance wiring. The surface of the metal wirings may be flat or having recesses and protrusions as long as the specified reflectance is maintained. The wiring having a surface layer of a high reflectance wiring may be configured to have the high reflectance layer exposed at the top, such as the configuration in which a transparent electrode is disposed over the high reflectance wiring. (2) The color filter substrate constituted of four colors, which includes Y (yellow) as well as RGB was used. (3) On the color filter substrate, additional black matrices were disposed for R picture elements and Y picture elements over locations other than conventionally-covered TFT elements, the spacers, and the space between picture elements. The coverage by the black matrix over the conventionally exposed metal area was increased by 50% in R picture elements and by 30% in Y picture elements. (4) The substrate of (1) and the color filter substrate of (2) were bonded together with liquid crystals sealed in between them. This completed the liquid crystal display device.

Figure 8:
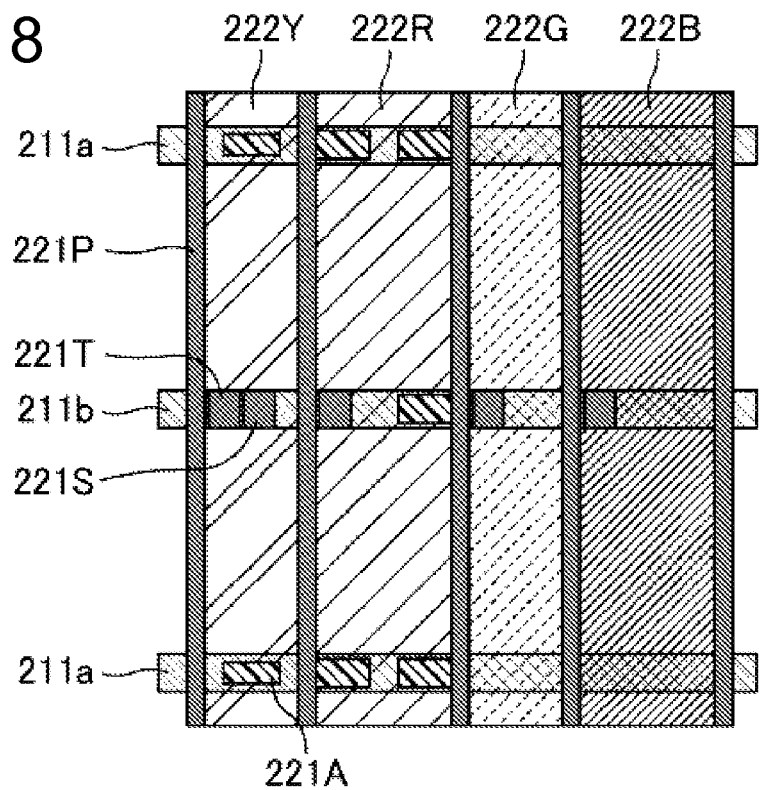
FIG. 8 is a plan view schematically showing a pixel of a liquid crystal display panel of Embodiment 2.

FIG. 8 is a plan view schematically showing a pixel of a liquid crystal display panel of Embodiment 2.

As shown in FIG. 8, in the liquid crystal display panel of Embodiment 2, black matrices are disposed over the TFT elements, over the spacers, and between the picture elements when the panel main surface is observed in a plan view. Specifically, a black matrix 221T is provided as the TFT light-shielding section in each of the picture element where a yellow color filter 222Y is disposed, the picture element where a red color filter 222R is disposed, the picture element where a green color filter 222G is disposed, and the picture element where blue color filter 222B is disposed. Also, a black matrix 221S is provided as the spacer light-shielding section in the picture element where a yellow color filter 222Y is disposed. Further, a black matrix 221P is provided as the inter-picture element light-shielding section. Also, an additional black matrix 221A is provided over the auxiliary capacitance wiring 211a and the gate wiring 211b in the picture element where a yellow color filter 222Y is disposed and in the picture element where a red color filter 222R is disposed. In the liquid crystal display panel of Embodiment 2, at least 75% of the surface area of the metal in the red picture element overlaps a light-shielding layer when the panel main surface is observed in a plan view. The amount of the additional light-shielding layer accounts for 50% of the conventionally exposed metal area in the red picture element, and accounts for 30% of the conventionally exposed metal area in the yellow picture element. The black matrix 221A, which is additionally provided, has a width that is smaller than both the width of the auxiliary capacitance wiring 211a and the width of the gate wiring 211b.

As shown in FIG. 8, the color arrangement of the color filter in Embodiment 2 is a repeated pattern of YRGB, and the area ratio of the colors are Y:R:G:B=1.0:1.6:1.0:1.6 for the color reproducibility and the white balance adjustment.

The spectral reflectance of the copper wiring used for the liquid crystal display panel of Embodiment 2 is similar to the spectral reflectance of the copper wiring shown in FIG. 3.

Figure 9:
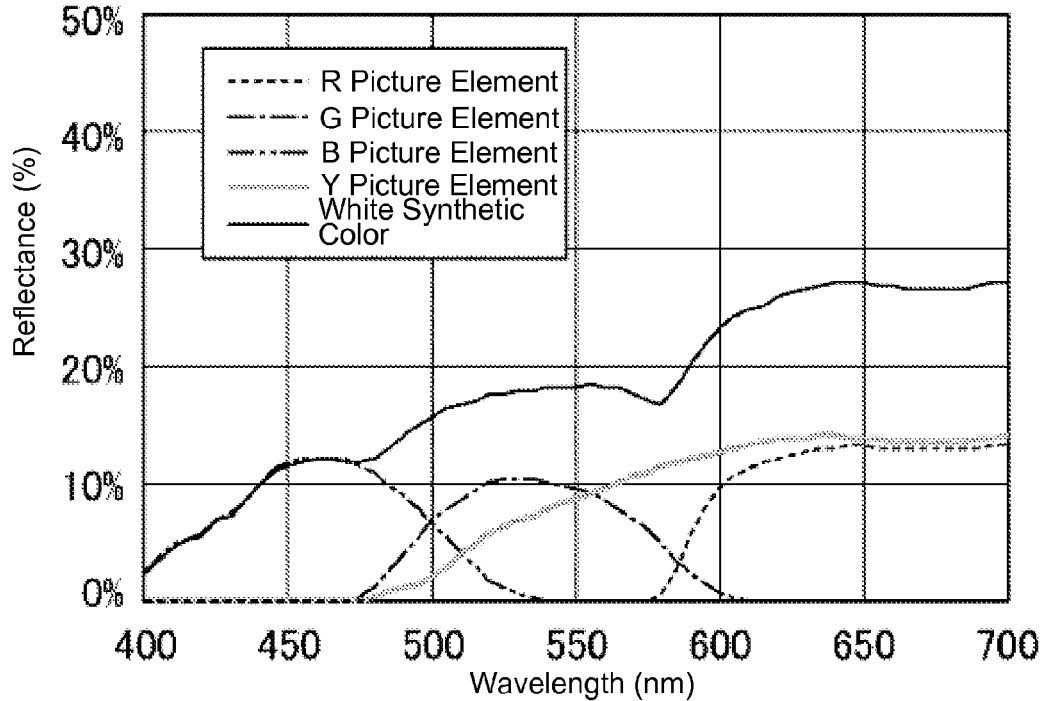
FIG. 9 is a graph showing the spectral reflectance of the liquid crystal display panel of Embodiment 2.

FIG. 9 is a graph showing the spectral reflectance of the liquid crystal display panel of Embodiment 2.

As shown in the figure, by providing additional black matrices in the red picture element (R picture element) and in the yellow picture element (Y picture element), the reflectance over the range of 600 to 700 nm can be suppressed.

Figure 10:
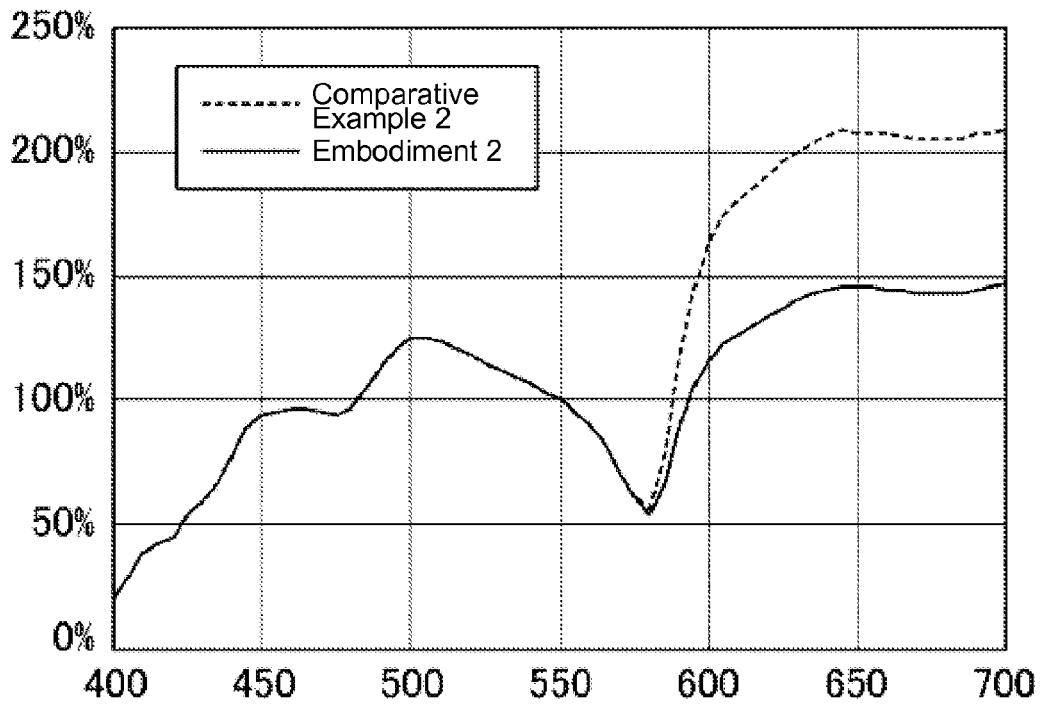
FIG. 10 is a graph showing the spectral reflectance of the liquid crystal display panel of Embodiment 2 and the spectral reflectance of a liquid crystal display panel of Comparative Example 2 relative to the reflectance at 550 nm, where the reflectance at 550 nm is defined to be 100%.

FIG. 10 is a graph showing the spectral reflectance of the liquid crystal display panel of Embodiment 2 and the spectral reflectance of a liquid crystal display panel of Comparative Example 2 relative to the reflectance at the wavelength of 550 nm, where the reflectance at 550 nm is defined to be 100%.

In the liquid crystal display panel of Embodiment 2, the reflectance at the display surface over the wavelength range of 600 to 700 nm is no greater than the reflectance at the display surface at the wavelength of 550 nm.

Figure 11:
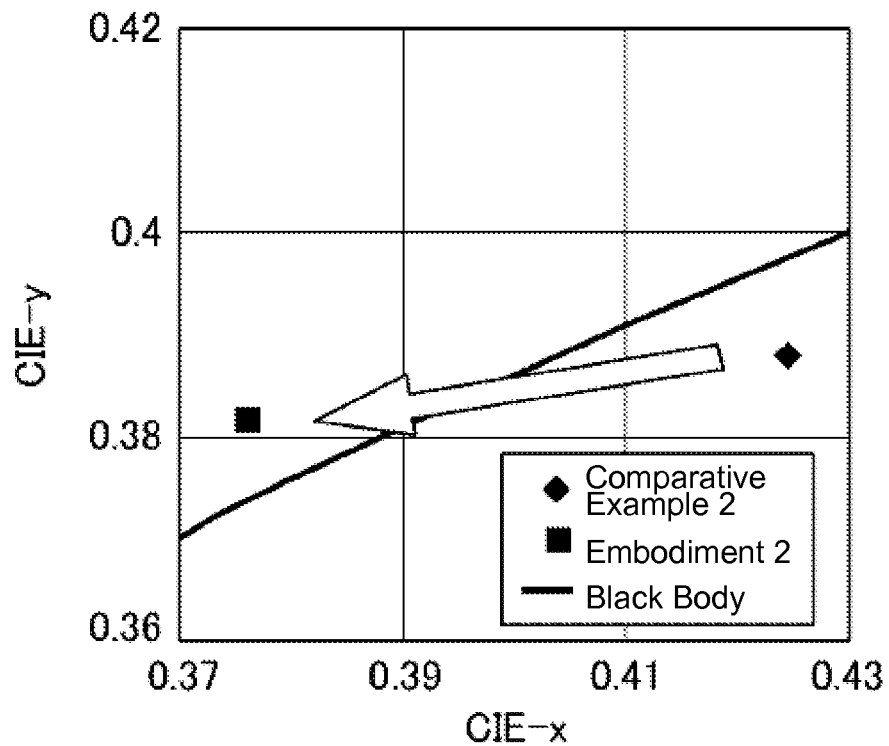
FIG. 11 is a graph showing the reflected light chromaticity of the liquid crystal display panel of Embodiment 2 and the reflected light chromaticity of the liquid crystal display panel of Comparative Example 2.

FIG. 11 is a graph showing the reflected light chromaticity of the liquid crystal display panel of Embodiment 2 and the reflected light chromaticity of a liquid crystal display panel of Comparative Example 2.

In the liquid crystal display panel of Embodiment 2, black matrices are disposed over a portion of exposed sections of metal wirings on the TFT substrate of the present invention, and additional black matrices are disposed so that the reflectance over the range of 600 to 700 nm is no greater than 150% of the reflectance at 550 nm, which is the central wavelength of the white balance where all colors are synthesized. As a result, the black body locus can be approximated on the chromaticity diagram, the reddish brown color addition that is peculiar to copper wirings can be reduced, and a liquid crystal display device with a good display quality can be manufactured.

As described above, in the present embodiment, the color tones can appropriately be controlled by reducing the exposed metal area.

Figure 12:
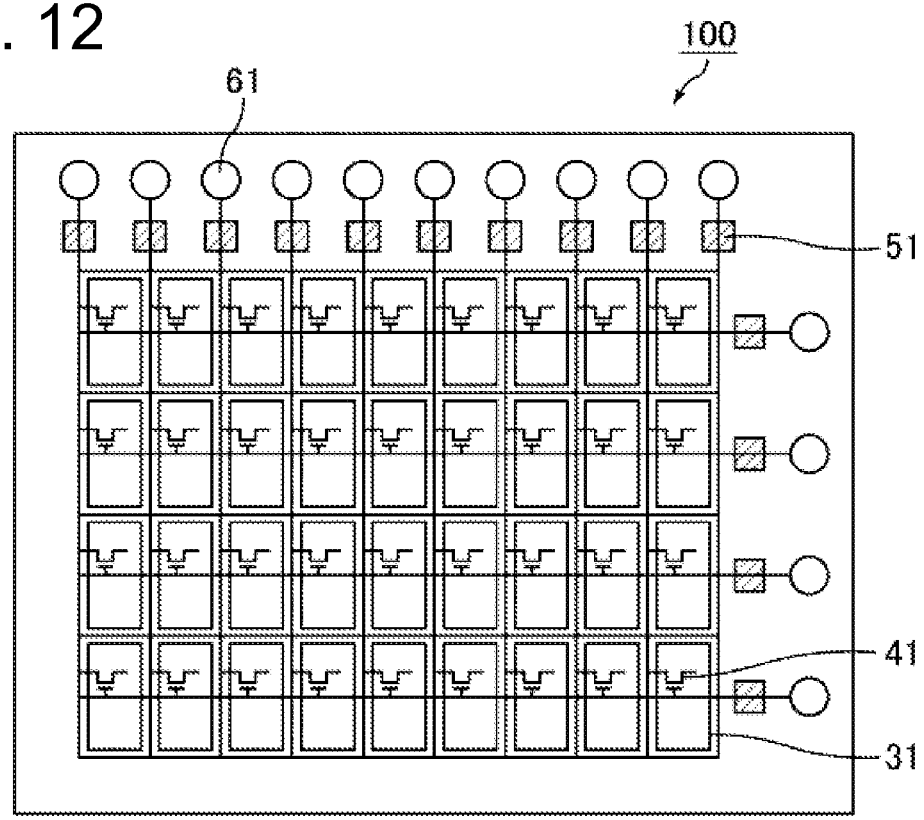
FIG. 12 is a plan view schematically showing a circuit substrate of the present embodiment.

FIG. 12 is a plan view schematically showing a circuit substrate of the present embodiment.

A circuit substrate 100 is the TFT side substrate on which thin film transistors (TFT) are provided. The substrate also includes a picture element electrode area (display region) and a region outside the picture element electrode area (non-display region).

In the non-display region, connecting sections 51 and terminal sections 61 are disposed. Through the connecting sections 51, the source driver can be mounted on the circuit substrate 100 with, for example, the chip-on-glass (COG) method. Also, through the terminal sections 61, flexible printed substrate (FPC) can be mounted on the circuit substrate 100. For example, through terminal sections 61 and 51, signals for driving the source driver can be inputted from FPC.

In the display region of the circuit substrate 100, the gate wiring and the source wiring are disposed on a glass substrate (not shown) to intersect with one another at a right angle. Further, a picture element electrode 31 and a TFT 41 are disposed in each of the regions defined by the gate wiring and the source wiring.

Figure 13:
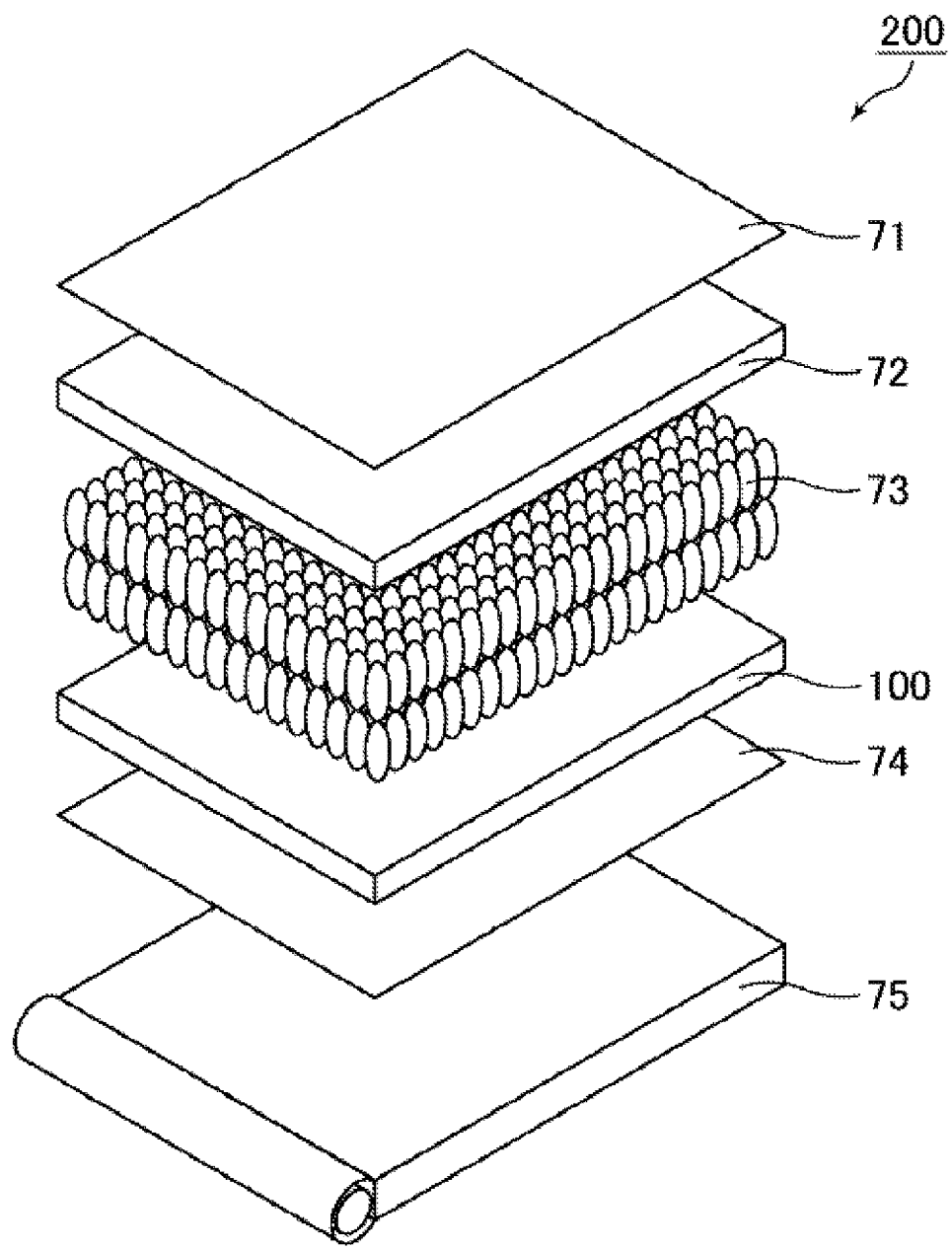
FIG. 13 is an exploded perspective view schematically showing the structure of the liquid crystal panel of the present embodiment.

FIG. 13 is an exploded perspective view schematically showing the structure of the liquid crystal panel of the present embodiment. As shown in FIG. 13, a CF side substrate 72 and a circuit substrate 100 of the liquid crystal panel 200 hold liquid crystals 73 in between. Also, the liquid crystal panel 200 includes a backlight 75 behind the circuit substrate 100. Light from the backlight 75 passes through a polarizing plate 74, the circuit substrate 100, the liquid crystals 73, the CF side substrate 72, and a polarizing plate 71 in this order. The light is transmitted or blocked through the control of the liquid crystal alignment.

Figure 14:
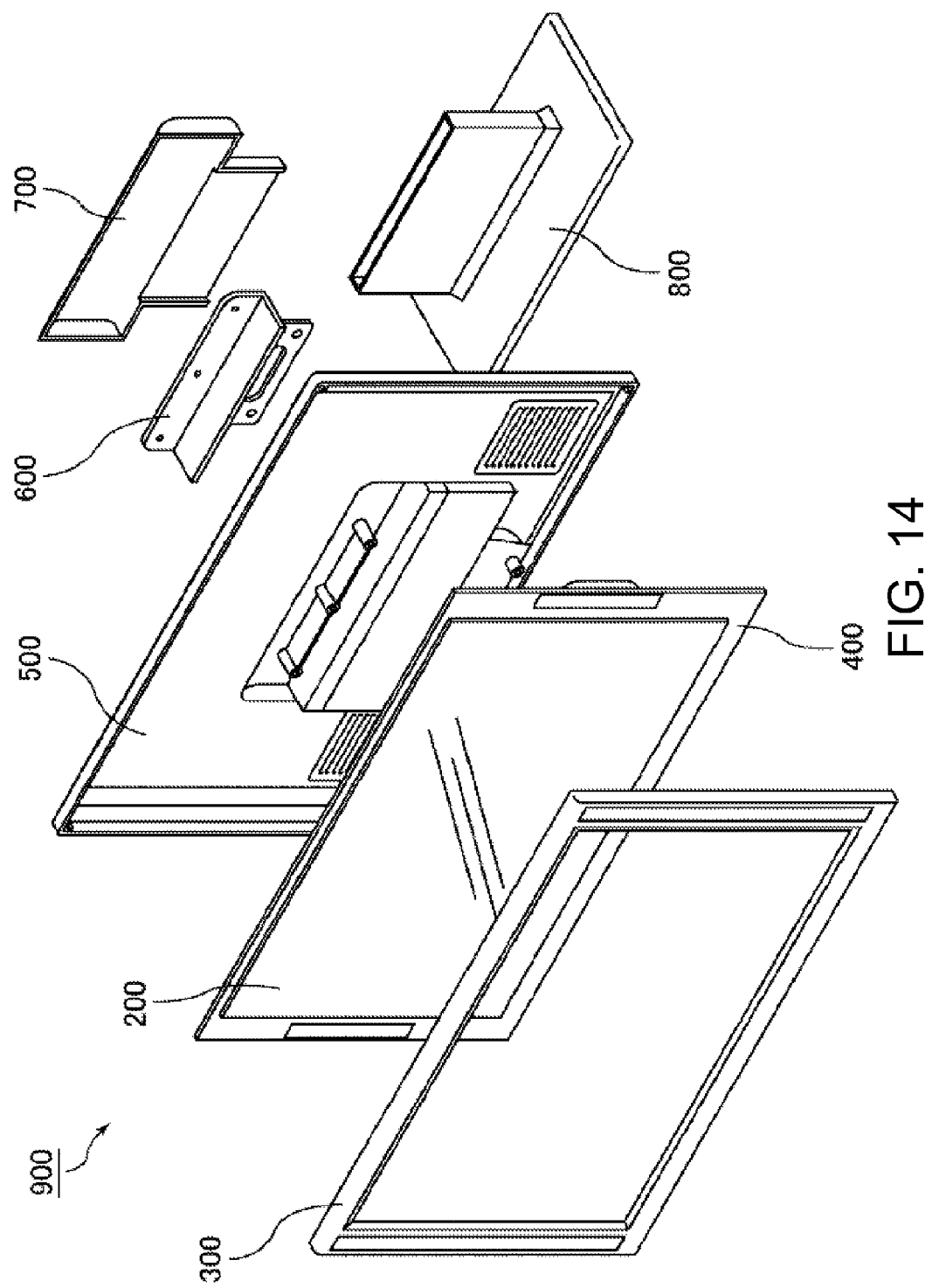
FIG. 14 is an exploded perspective view schematically showing the structure of a liquid crystal display device including the liquid crystal panel shown in FIG. 13.

FIG. 14 is an exploded perspective view schematically showing the structure of a liquid crystal display device including the liquid crystal panel shown in FIG. 13. As shown in FIG. 14, the liquid crystal panel 200 is attached to a fixing panel 400, and is sealed in between a front cabinet 300 and a back cabinet 500. The back cabinet 500 and an upper stand 700 are secured together through a metal bracket 600. Also, the upper stand 700 and a lower stand 800 are engaged to one another.

Comparative Example 1

Figure 15:
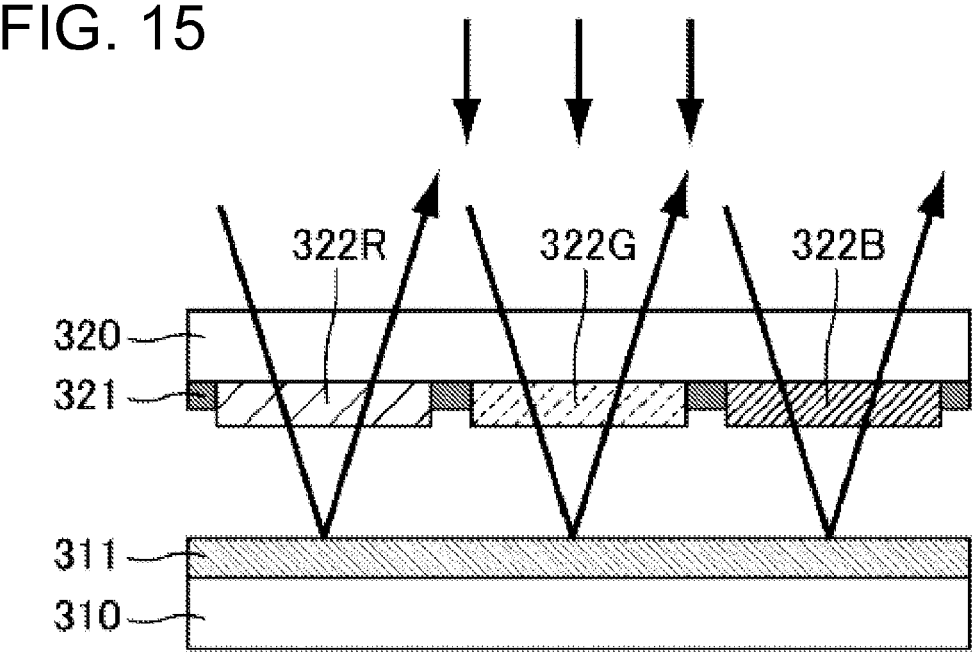
FIG. 15 is a cross-sectional view schematically showing the external light reflection of a liquid crystal display panel of Comparative Example 1.

FIG. 15 is a cross-sectional view schematically showing the external light reflection of a liquid crystal display panel of Comparative Example 1.

A liquid crystal display panel of Comparative Example 1 was obtained through steps (1) to (4) below. (1) A TFT substrate, which is a glass substrate 310 having a low-resistance copper wiring disposed thereon as the metal wiring 311, was used. (2) A color filter substrate, which is a glass substrate 320 having color filters constituted of three RGB colors (322R, 322G, and 322B) disposed thereon, was used. (3) On the color filter substrate, black matrices 321 were disposed over the TFT elements, over the spacers, and between the picture elements as in a conventional configuration. (4) The substrate of (1) and the color filter substrate of (2) were bonded together with liquid crystals sealed in between them. This completed the liquid crystal display device.

Figure 16:
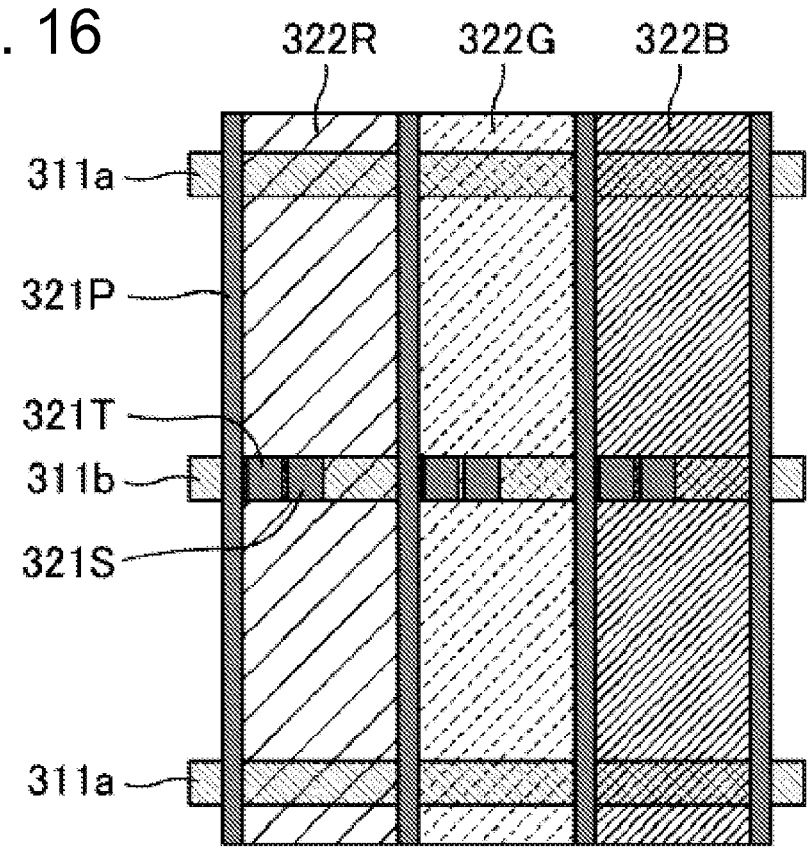
FIG. 16 is a plan view schematically showing a pixel of the liquid crystal display panel of Comparative Example 1.

FIG. 16 is a plan view schematically showing a pixel of a liquid crystal display panel of Comparative Example 1.

As shown in FIG. 16, in the liquid crystal display panel of Comparative Example 1, black matrices are disposed only over the TFT elements, over the spacers, and between the picture elements when the panel main surface is observed in a plan view. Specifically, a black matrix 321T is provided as the TFT light-shielding section and a black matrix 321S is provided as the spacer light-shielding section in each of the picture element where a red color filter 322R is disposed, the picture element where a green color filter 322G is disposed, and the picture element where a blue color filter 322B is disposed. Also, a black matrix 321P is provided as the inter-picture element light-shielding section.

Figure 17:
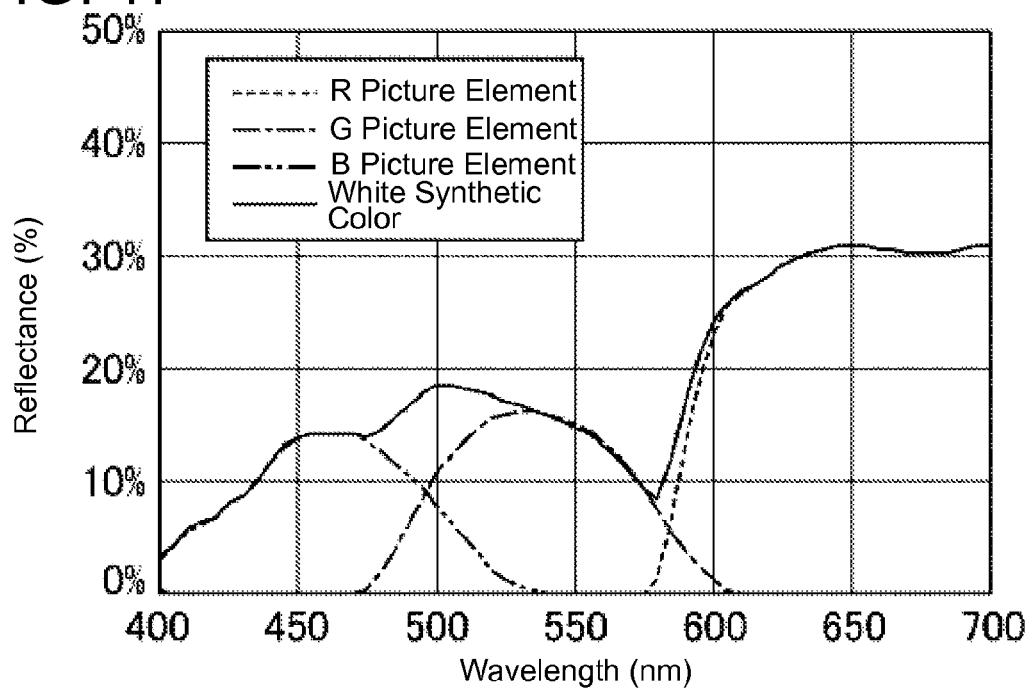
FIG. 17 is a graph showing the spectral reflectance of the liquid crystal display panel of Comparative Example 1.

FIG. 17 is a graph showing the spectral reflectance of the liquid crystal panel of Comparative Example 1.

With a TFT substrate using a low-resistance copper wiring, the added color peculiar to copper (reddish brown) is emphasized by the R color filter (also referred to as R coloring layer), deteriorating the display quality in the presence of external light.

Comparative Example 2

Figure 18:
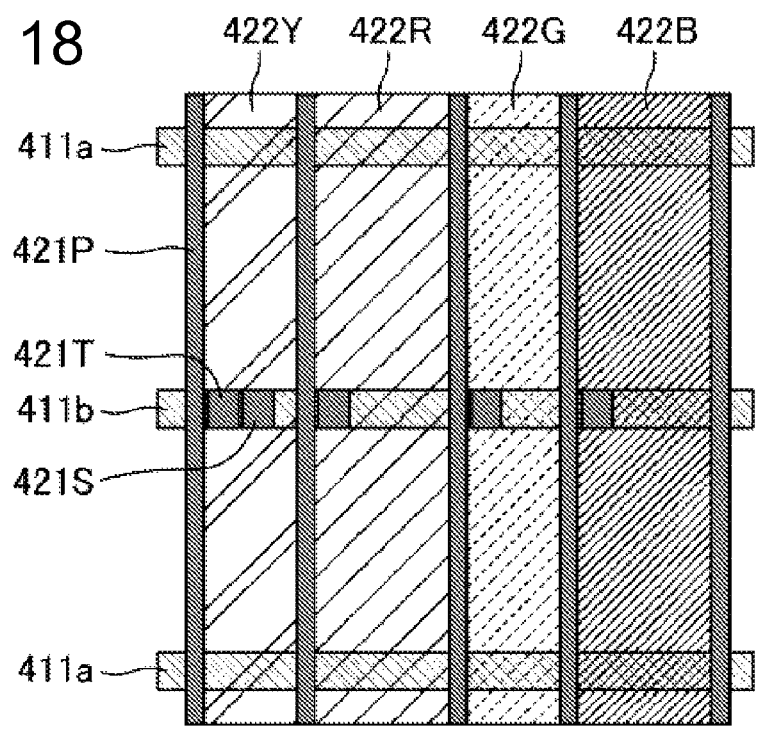
FIG. 18 is a plan view schematically showing a pixel of the liquid crystal display panel of Comparative Example 2.

FIG. 18 is a plan view schematically showing a pixel of a liquid crystal display panel of Comparative Example 2.

As shown in FIG. 18, in the liquid crystal display panel of Comparative Example 2, black matrices are provided over the TFT elements, over the spacers, and between the picture elements when the panel main surface is observed in a plan view. Specifically, a black matrix 421T is provided as the TFT light-shielding section in each of the picture element where a yellow color filter 422Y is disposed, the picture element where a red color filter 422R is disposed, the picture element where a green color filter 422G is disposed, and the picture element where a blue color filter 422B is disposed. Also, a black matrix 421S is provided as the spacer light-shielding section in the picture element where a yellow color filter 422Y is disposed. Further, a black matrix 221P is provided as the inter-picture element light-shielding section.

Figure 19:
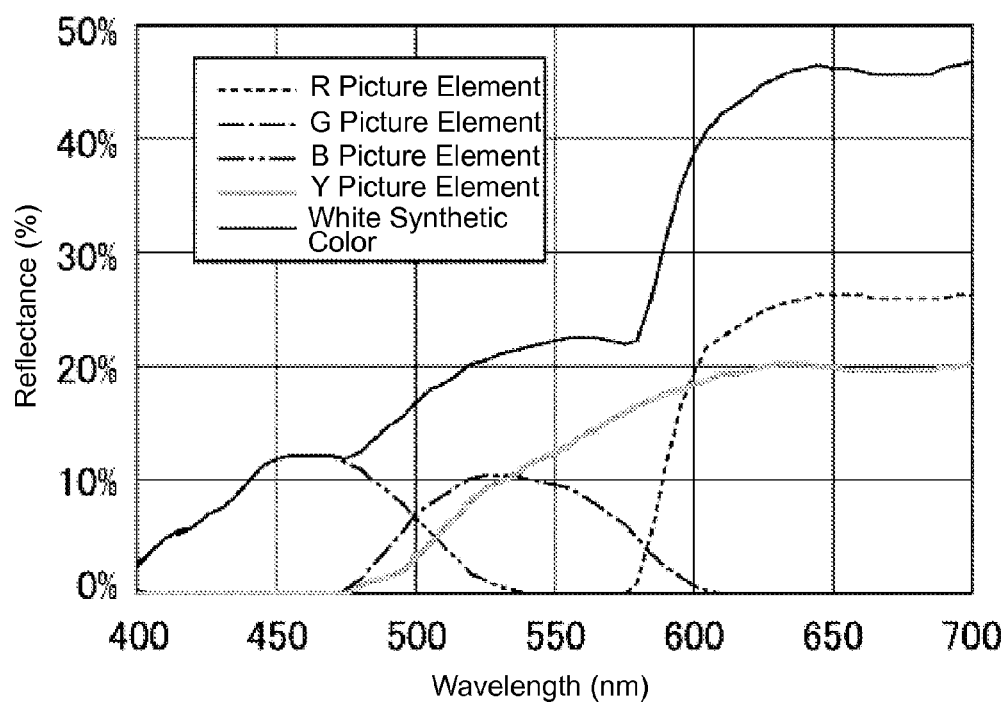
FIG. 19 is a graph showing the spectral reflectance of the liquid crystal display panel of Comparative Example 2.

FIG. 19 is a graph showing the spectral reflectance of a liquid crystal display panel of Comparative Example 2.

With a TFT substrate using a low-resistance copper wiring, the added color peculiar to copper (reddish brown) is emphasized by the R color filter, deteriorating the display quality in the presence of external light.

Configurations of the embodiments described above may appropriately be combined within the scope of the present invention.

The present application claims priority to Patent Application No. 2010-039305 filed in Japan on Feb. 24, 2010 under the Paris Convention and provisions of national law in a designated State. The entire contents of which are hereby incorporated by reference.

DESCRIPTION OF REFERENCE CHARACTERS

| | |
|---|---|
| 11a, 111a, 211a, 311a, 411a | auxiliary capacitance wiring |
| 11b, 111b, 211b, 311b, 411b | gate wiring |
| 13S | source wiring |
| 21S, 121S, 221S, 321S, 421S | black matrix as the spacer light-shielding section |
| 21T, 121T, 221T, 321T, 421T | black matrix as the TFT light-shielding section |
| 21P, 121P, 221P, 321P, 421P | black matrix as the inter-picture element light-shielding section |
| 21A, 121A, 221A, 321A | additional black matrix |
| 22R, 122R, 222R, 322R, 422R | red color filter |
| 22G, 122G, 222G, 322G, 422G | green color filter |
| 22B, 122B, 222B, 322B, 422B | blue color filter |
| 31 | picture element electrode |
| 41 | TFT |
| 51 | connecting section |
| 61 | terminal section |
| 71, 74 | polarizing plate |
| 72 | CF side substrate |
| 73 | liquid crystals |
| 75 | backlight |
| 100 | circuit substrate |
| 200 | liquid crystal panel |
| 222Y, 422Y | yellow color filter |
| 300 | front cabinet |
| 310, 320 | glass substrate |
| 311 | metal wiring |
| 321 | black matrix |
| 400 | fixing panel |
| 500 | back cabinet |
| 600 | metal bracket |
| 700 | upper stand |
| 800 | lower stand |
| 900 | liquid crystal display device |

The invention claimed is:

1. A liquid crystal display panel comprising a wiring constituted of a metal having a 90% reflectance over a wavelength range within a visible light range,
   wherein a reflectance of said liquid crystal display panel at a display surface over a wavelength range of 600 to 700 nm is no greater than 150% of a reflectance of said liquid crystal display panel at the display surface at a wavelength of 550 nm.

2. The liquid crystal display panel according to claim 1, wherein when a main surface of the panel is observed in a plan view, at least 75% of a surface area of said metal wiring in a picture element displaying a color of red overlaps a light-shielding layer.

3. The liquid crystal display panel according to claim 1, wherein when the main surface of the panel is observed in a plan view, at least a portion of said wiring overlaps a light-shielding layer having a width that is about equal to a width of said wiring and/or a light-shielding layer having a width that is smaller than the width of said wiring.

4. The liquid crystal display panel according to claim 1, wherein a surface layer section of said wiring is made of copper or an alloy containing copper.

5. A liquid crystal display panel according to claim 1, wherein said liquid crystal panel includes an active matrix substrate using thin film transistors.

6. A liquid crystal display device comprising the liquid crystal display panel according to claim 1.

* * * * *